INVENTOR
JOHN VAN DEN KIEBOOM

July 9, 1968

J. VAN DEN KIEBOOM 3,391,586

MACHINING APPARATUS

Filed March 21, 1966

INVENTOR
JOHN VAN DEN KIEBOOM

BY *Olsen and Stephenson*
ATTORNEYS

July 9, 1968   J. VAN DEN KIEBOOM   3,391,586
MACHINING APPARATUS
Filed March 21, 1966   4 Sheets-Sheet 3
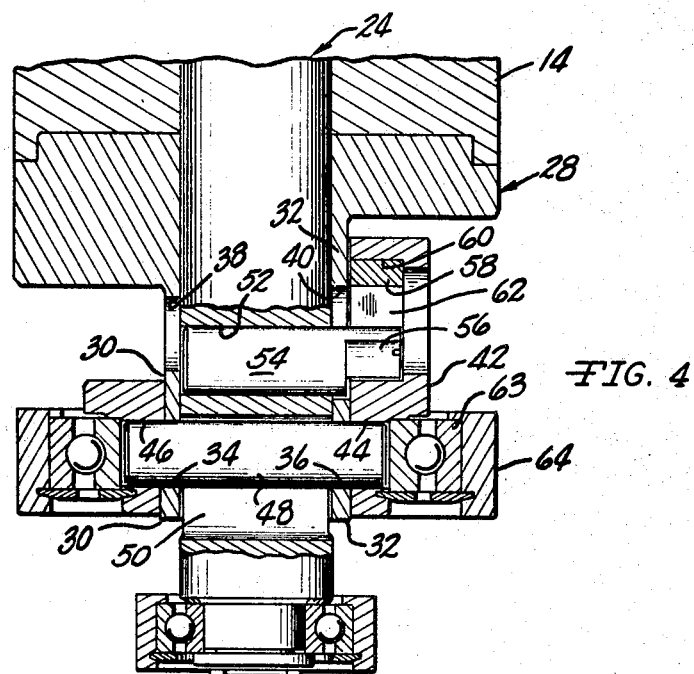
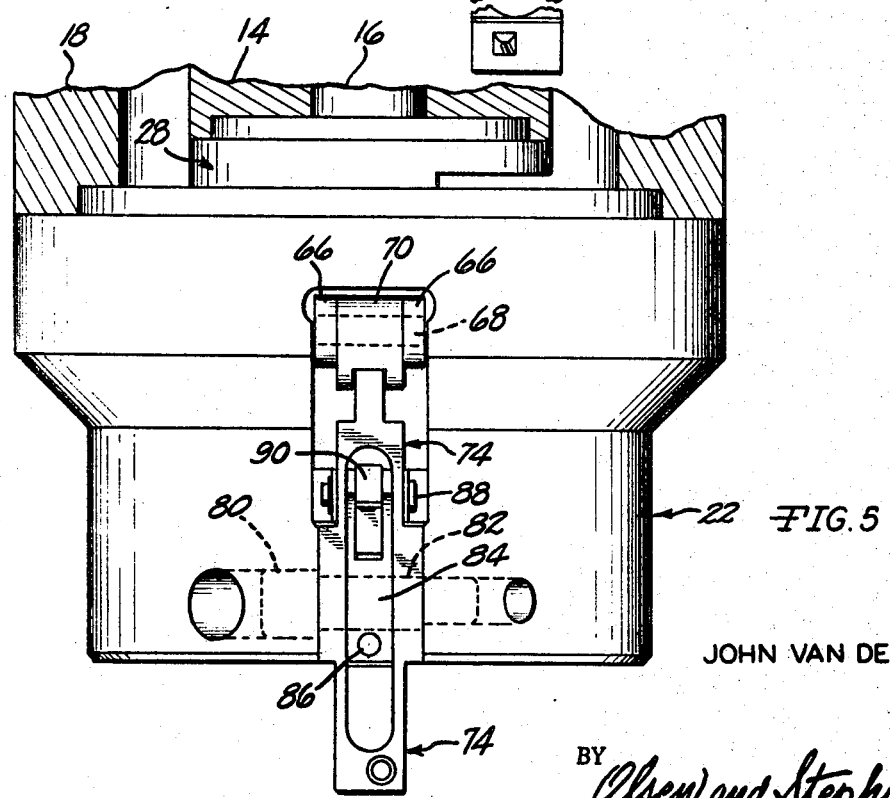
INVENTOR
JOHN VAN DEN KIEBOOM
BY *Olsen and Stephenson*
ATTORNEYS

United States Patent Office 3,391,586
Patented July 9, 1968

3,391,586
MACHINING APPARATUS
John Van Den Kieboom, Mount Clemens, Mich., assignor to La Salle Machine Tool, Inc., Warren, Mich., a corporation of Michigan
Filed Mar. 21, 1966, Ser. No. 536,090
10 Claims. (Cl. 82—18)

ABSTRACT OF THE DISCLOSURE

A machine for turning pistons for internal combustion engines in which a tool head is rotated about its axis and a cutting tool is mounted on the tool head so that it is moved in a noncircular path of preselected configuration about the axis of rotation of the tool head in response to rotation of the tool head thereby enabling the turning of pistons to desired noncircular shapes.

---

The present invention relates to machines for forming pistons for internal combustion engines, and more particularly, to a tool head for use in cutting the skirt of the piston to a desired configuration.

It is now common practice in manufacturing pistons for internal combustion engines to cut the skirts of the pistons to shapes other than a true circular cylinder. One of the reasons for doing this is that the pistons are made of metal which is non-uniformly distributed about the axis of the piston, thereby resulting in irregular thermal-expansion of the piston when subjected to the high temperature conditions of a modern internal combustion engine. Under these conditions of operation, it is desired that the cold piston have a shape so that when expanded under these high temperature conditions the shape it will assume assures that the most favorable wear, sealing and friction conditions are present.

To overcome problems such as this, it is now common practice to manufacture pistons with slightly distorted initial shapes, but which, when the engine is heated to operating temperatures, will more nearly assume the optimum shape for best performance. Thus, pistons with elliptical cross-sections are commonly used today to compensate for irregular thermal-expansion of the piston skirt which occurs at least in part because of the extra metal in the skirt at the wrist pin openings.

One of the known ways for machining pistons to give them an elliptical cross-section can be found in United States Patent No. 2,720,806. As there disclosed, a piston is supported so as to be moved axially on an arm for feeding it into a tool head. The tool head is rotated about an axis which is inclined to the axis of the advancing piston. By virtue of this arrangement, the cutting tool, which is mounted on the rotary tool head, will cut the skirt of the piston so that in cross-section, it will be in the shape of an ellipse. In addition to cutting the skirt of the piston in the form of an ellipse, it may also be desired to taper the skirt in an axial direction. This can also be accomplished by the machine shown in United States Patent No. 2,720,-806. As there disclosed, the cutting tool is mounted on a pivot on the rotary tool holder, and the pivotally mounted cutting tool is responsive to movement of the piston so as to increase or reduce the diameter of the circle in which the cutting tool travels. By varying this diameter as the workpiece advances, a taper will be formed on the skirt. A machine such as is disclosed in this patent has limited application because the ellipse can be changed only by changing the angle of inclination of the axis of the tool head relative to the axis of advance of the workpiece. Also, changing this angle of inclination varies only the dimension of the minor axis of the ellipse defined by the effective cutting path of the tool, and frequently it is necessary that the dimension of the major axis be varied or that both axes be varied.

It is an object of the present invention to provide an improved tool head for use in machines for forming pistons of desired cross-section which is constructed and arranged so that it can be used to provide a greater variety of configurations of the piston skirts than was possible with machines used heretofore.

It is another object of the present invention to provide a tool head of the foregoing character which can be readily adapted to cut piston skirts of any desired predetermined elliptical shape, to cut any desired taper on the skirt, and to vary selectively the extent of the taper so that the piston skirt may be "barrel shaped," and the like.

It is another object of the present invention to provide a tool head for forming pistons of desired cross-section which is constructed and arranged so that a cutting tool can be turned in a non-circular path of preselected configuration about its axis of rotation, thereby enabling any desired shape to be assumed by the article being cut.

It is another object of the present invention to provide a tool head of the foregoing character which is constructed and arranged so that minimum wearing conditions are present during operation of the tool head, thereby assuring a maximum life for the tool head.

In accordance with the present invention, a tool head is provided for machining piston skirts or similar articles, comprising a tool support mounted to rotate around an axis, an adjustable pivot carried by said support, an arm pivotally mounted on said adjustable pivot for reciprocal movement of one end of the arm toward and away from said axis, said one end being adapted to carry a cutting tool, arm-actuating means coupled to said arm and responsive to turning of said support for moving said one end in a plane normal to said axis and in an elliptical path around said axis, said arm-actuating means including a draw-bar adapted to be moved axially along said axis during rotation of said support, first means coupling said draw-bar to said arm and responsive to axial movement of said draw-bar to vary the movement of said arm so as to change the dimension of the minor axis of the ellipse defined by the path of movement of said one end, second means coupled to said draw-bar and said adjustable pivot for laterally displacing the pivot in response to axial movement of said draw-bar so as to change uniformly the dimensions of the major and minor axes of the ellipse defined by the path of movement of said one end.

Further objects, features and advantages of this invention will become apparent from a consideration of the following description, the appended claims, and the accompanying drawing, in which:

FIGURE 4 is a fragmentary section taken on the line 4—4 of FIG. 1;

FIGURE 5 is a fragmentary side elevation of the tool head as seen from the right side of FIG. 1.

Before explaining the present invention in detail, it is to be understood that the invention is capable of other embodiments and of being practiced or carried out in various ways. It is also to be understood that the phraseology or terminology employed herein is for the purpose of description and not of limitation.

Figure 6:
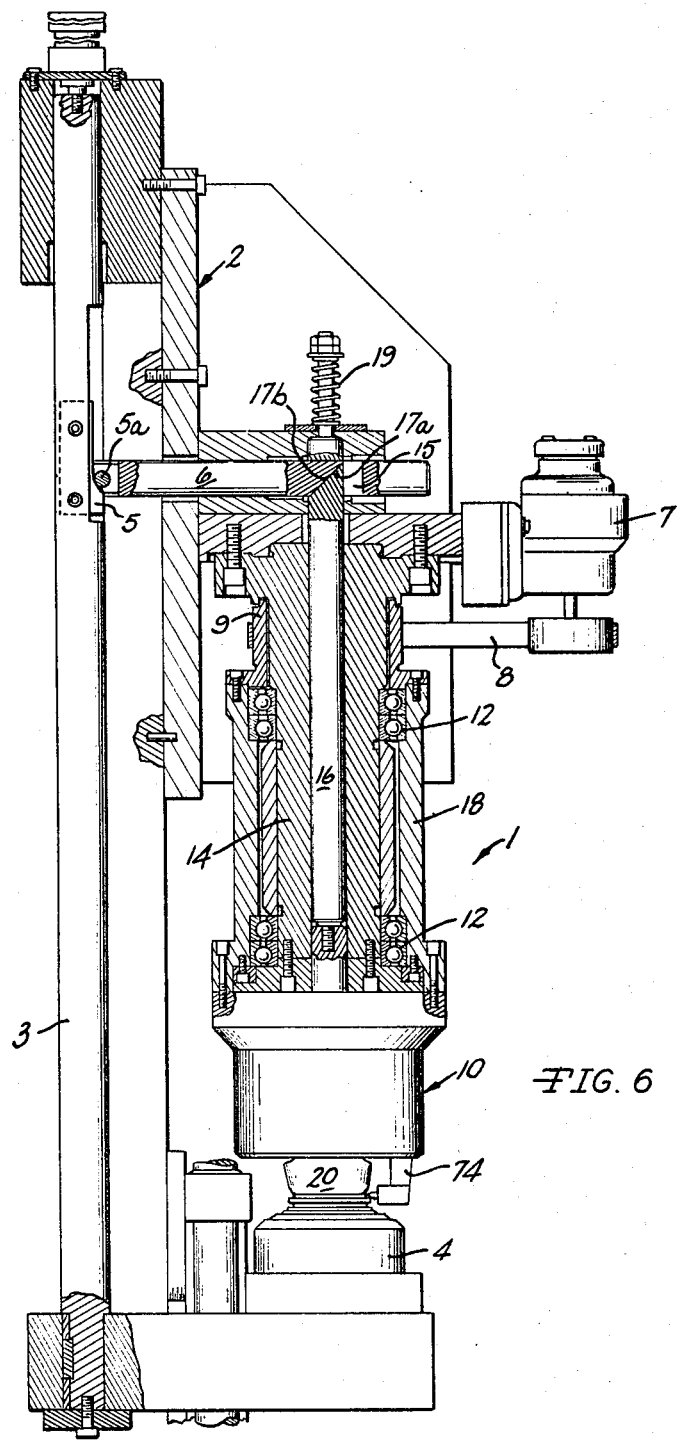
FIGURE 6 is an elevational view of a piston turning machine utilizing the apparatus of this invention.

Referring now to the drawings, the invention will be described in greater detail. The tool head 10 (FIG. 1) is shown mounted on a machine 1 (FIG. 6) for turning a piston 20. The machine 1 includes a stationary frame 2 on which a cylinder actuated rod 3 is mounted for up and down movement. A piston supporting fixture 4 is mounted on the lower end of the rod 3 so that on upward movement of the rod 3 the piston 20 is moved toward the tool head 10. The machine 1 also includes a cam 5 secured to the rod 3 at a position to engage a cam follower 5a carried by a bar 6 which is slidably mounted on the frame 2 so that it is moved in a direction perpendicular to rod 3 by cam 5 during upward movement of rod 3 for a purpose to appear presently. In the illustrated embodiment of the invention, a drive motor 7, mounted on frame 2, drives a belt 8 for rotating a drive sleeve 9, but it is to be understood that other drive structure for rotating sleeve 9 can also be utilized. A stationary upright sleeve 14 is mounted on frame 2 and carries bearings 12 for rotatably supporting a sleeve 18 secured to and driven by the drive sleeve 9. Thus, on operation of motor 7, sleeve 18 is rotated around stationary sleeve 14.

A draw-bar 16 extends axially through the sleeve 14 and through a slot 15 in the bar 6. Engaging cam surfaces 17a and 17b on the bars 6 and 14, respectively, are maintained in engagement by a spring 19 which urges the draw-bar 16 upwardly. It can thus be seen that when rod 3 is moved downwardly from its FIG. 6 position to withdraw a piston 20 from tool head 10, the draw-bar 16 will be moved upwardly by the spring 19 to in turn cause the bar 6 to be moved to the left to maintain follower 5a against cam 5. When another piston 20 to be machined is moved to a supported position on fixture 4, rod 3 is moved upwardly, cam 5 then operating to move draw-bar 16 downwardly at a variable rate determined by the shape of cam 5.

The tool head 10 includes a rotatable, cup-shaped, tool support 22 which is secured to the rotary sleeve 18 for rotation therewith about the axis of the rotary sleeve 18 which coincides with that of the draw-bar 16. Attached to the draw-bar 16 for axial movement therewith is a bar or element 24 which is adapted to move, in response to the movement of the draw-bar 16, to positions between the solid line position shown in FIG. 1 and the fragmentary broken line position indicated by reference number 26 in FIG. 1. Attached to the stationary sleeve 14 and forming a part of the tool head 10 is a stationary collar 28 which encircles the rod or element 24.

As seen best in FIG. 4, the stationary collar 28 has depending flanges 30 and 32 in which are located circular coaxial holes 34 and 36. Also formed in flange 30 above the hole 34 is a second hole 38 which normally will be circular in configuration. An elongated slot 40 is formed in flange 32 diametrically opposite and in alignment with the opening 38 of flange 30.

Pivotally supported on the stationary collar 28 is a pivotal sleeve member 42. The latter has diametrically opposite, aligned holes 44 and 46 through which a pin 48 extends. It will be observed that the pin 48 also passes through the openings 34 and 36, thereby providing a pivotal mounting for the sleeve member 42 on the depending flanges 30 and 32 of stationary collar 28. In order to permit axial movement of the rod or element 24 relative to the sleeve member 42, a longitudinally extending slot 50 is provided in bar or element 24 in which the pin 48 can slide. Also formed in the rod or element 24 is a transverse bore 52 in which is located a pin 54. The latter projects through the slot 40 formed in flange 32 and has formed on its outer end a cam follower 56 which is adapted to travel in the slotted cam 58 which is inserted into a pocket 60 in the sleeve member 42. As can be seen best in FIG. 1, the cam member 58 has a slotted cam surface 62 in which the cam follower 56 is adapted to travel, and the slotted cam surface 62 is inclined with respect to the vertical axis of the rod or element 24 an amount indicated by the angle A. Thus, when the rod or element 24 is reciprocated relative to the stationary collar 28, the stationary pin 48 will serve as a pivot for the sleeve member 42 which will pivot to the position shown in FIG. 1 when the rod 24 is advanced to the lowermost position shown in solid lines in FIG. 1. However, when the rod 24 is retracted to the uppermost position shown in FIG. 3, the sleeve member 42 will be pivoted to the position shown therein so that the angle A will have been decreased. These movements are effected by cam follower 56 which moves vertically with rod 24 but travels in the inclined cam surface 62.

Figure 1:
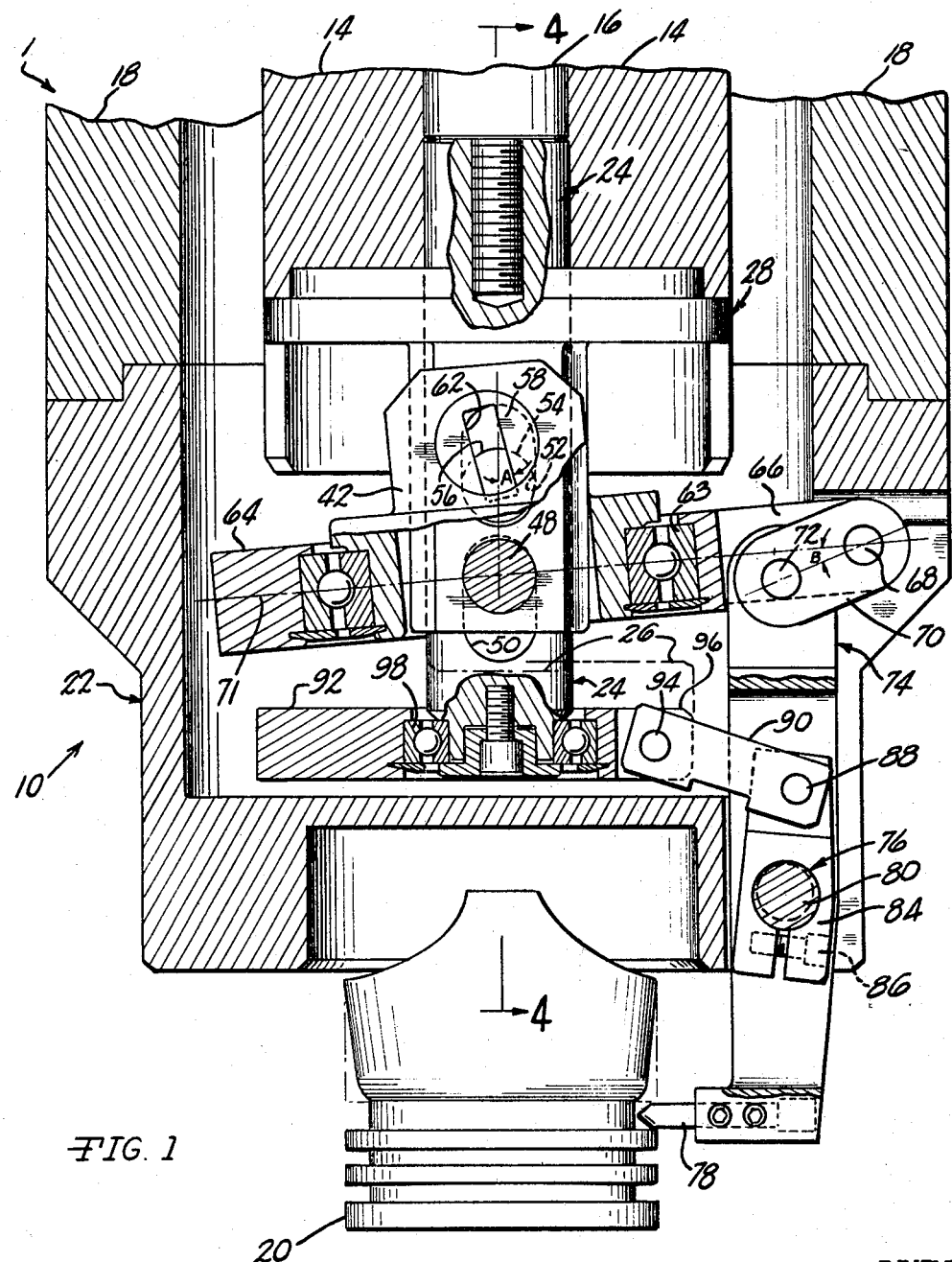
FIGURE 1 is a fragmentary vertical section of a tool head embodying the present invention, and illustrating a piston in a position of manufacture.

Supported on the lower end of the sleeve member 42 by means of a suitable ball bearing 63 is a rotatable arm-actuating collar 64. The latter has two parallel rigid arms 66, only one of which is shown in FIG. 1, projecting radially outwardly from one side thereof. Supported between the radially extending arms 66 is a spherical pivot 68 and mounted for universal pivotal movement thereon is a linkage 70. The latter is pivotally connected by means of a pivot pin 72 to the upper end of a tool-support arm 74. The tool-support arm 74 is pivotally mounted on the rotatable tool support 22 by an eccentric pivot 76 which will be described presently. It will be observed that the tool-support arm 74 carries at its lower end a conventional cutting tool 78.

Figure 2:
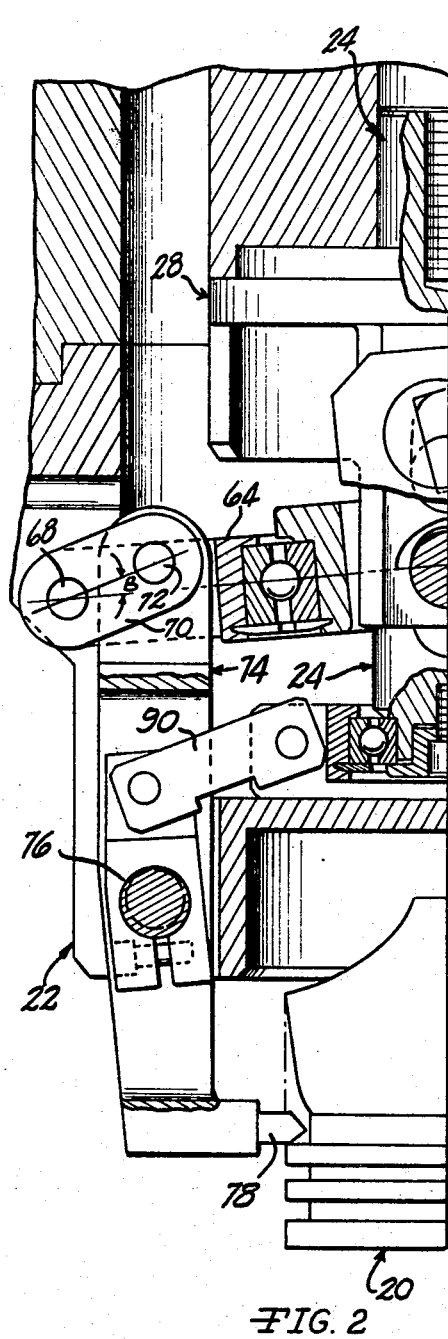
FIGURE 2 is a fragmentary vertical section similar to that of FIG. 1, but showing the cutting tool and its supporting structure when turned 180° out of phase with its position in FIG. 1.
Figure 3:
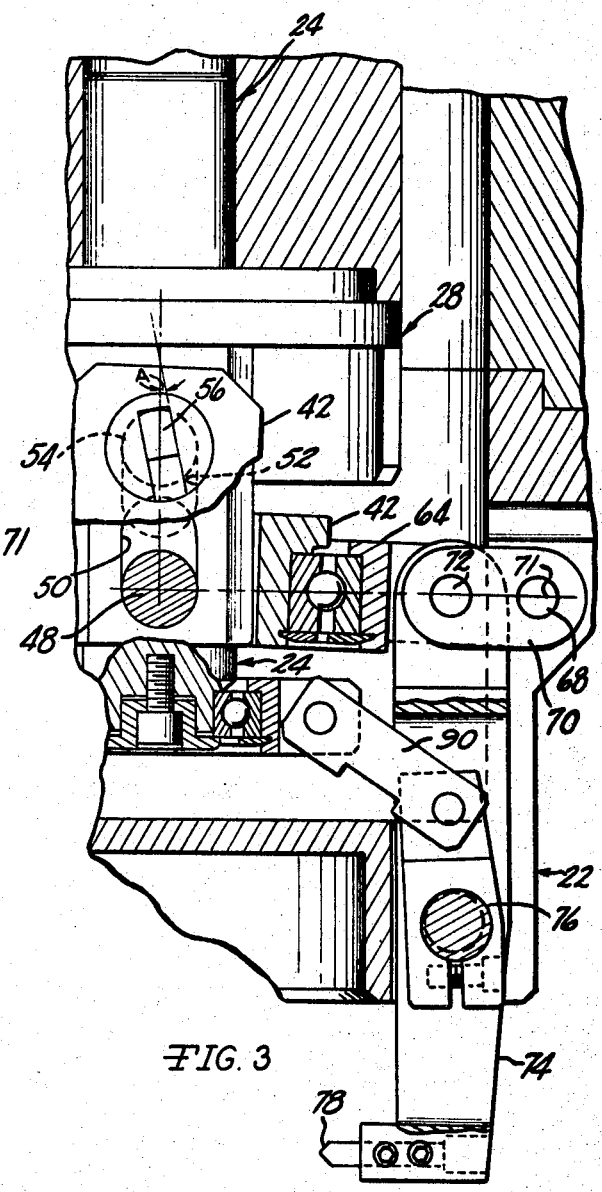
FIGURE 3 is a fragmentary vertical section similar to that of FIG. 1, but showing the tool head in position for moving the cutting tool in a circular path, the illustrated position of the cutting tool and its support arm being also the position thereof when turned 90° out of phase with its FIG. 1 and FIG. 2 positions.

From the foregoing description, it will be understood that when the rotatable tool support 22 is rotated about the axis of the draw-bar 16, the cutting tool 78 will be rotated therewith by virtue of its mounting on the arm 74 which in turn is mounted on the rotatable tool support 22 by means of the eccentric pivot 76. As previously explained, when the draw-bar 16 is in a retracted position, such as is shown in FIG. 3, the pivotal sleeve member 42 will assume the position there shown, in which the pivot pins 68 and 72 as well as the pin 48 will have their axes in a common plane 71 so that the upper end of the arm 74 will not reciprocate during rotation of tool support 22. The upper end of arm 74 will travel in a circle about the draw-bar 16, and, therefore, the lower end of the arm 74 and its cutting tool 78 will also travel in a circle. However, when the draw-bar 16 is moved downwardly into tool head 10 so that the element 24 is extended to the lowermost position, shown in FIG. 1, the pivotal sleeve member 42 will assume the position there shown in which the linkage 70 is inclined with respect to the plane 71 by an amount indicated by angle B. As a result, during rotation of tool support 22, the rotatable arm-actuating collar 64 will rotate in a circle which is inclined to the axis of rotation of rotatable tool support 22. Thus, the upper end of arm 74 will be caused to travel in an elliptical path around the axis, and this same elliptical motion will be translated to the lower end of the arm 74 resulting in the cutting tool 78 travelling in an elliptical path relative to the axis of rotation of the rotatable tool support 22. It will be understood that such elliptical movement occurs at the upper end of arm 74, when it is noted that linkage 70 will oscillate about pivot 68 between the two positions shown in FIGS. 1 and 2 during each 180° of travel around the axis of rotation of tool support 22. The total angle of oscillation of linkage 70 is thus twice the angle B. Only the lateral movement of such oscillating movement will be imparted to upper end of arm 74, because arm 74 is vertically disposed and is pivotally supported on eccentric pivot 76. This lateral movement is a maximum during each rotation of tool support 22 when tool support 22 is in the FIG. 1 and FIG. 2 positions and when it is in positions rotated 90° relative to the FIG. 1 and FIG. 2 positions. In the positions of the tool support 90° out of phase with the FIG. 1 and FIG. 2 positions the angle B is zero, so that the pivot 72 is moved toward the axis of tool support 22 from its FIG. 1 and FIG. 2 positions. This causes the upper end of arm 74 to move inwardly toward the tool support axis, which in turn causes the lower end of arm 74, and thus tool 78, to move outwardly away from the axis. Consequently, during each rotation of tool support 22 through 360°, the tool 78 travels along an elliptical path, the minor axis of which is defined when the tool 78 is in the FIG. 1 and FIG. 2 positions and the major axis of which is defined when the tool 78 is in positions 90° out of phase with the FIG. 1 and FIG. 2 positions. Thus, as draw-bar 16 is moved from the FIG. 3 position toward the FIG. 1 position, during movement of a piston 20 into tool head 10, angle B is increased from zero to the angle shown in FIGS. 1 and 2, as determined by cam surface 62. The major axis of the piston skirt surface will remain the same but the minor axis will be changed as angle B is changed.

Thus it can be seen that an arm-actuating means is provided which is coupled to the arm 74 and is responsive to turning of the rotatable tool support 22 for moving the lower end of the arm 74 back and forth with respect to the axis of the rotatable tool support 22 and the tool 78 will remain in a plane which is perpendicular to said axis. It is also to be observed that the extent of reciprocal movement of the cutting tool 78 can be controlled by the specific shape of the cam surface 62 since this shape determines the magnitude of angle B. Thus, when the rod 24 is retracted to the position shown in FIG. 3, there will be no reciprocal action of the tool 78, and therefore, the tool will travel in a circle. However, when the rod 24 is advanced to the position shown in FIG. 1, the minor axis of the ellipse will be reduced relative to the major axis, and therefore an elliptical path will be defined by movement of the cutting tool 78 around the axis of rotatable tool support 22. It will be understood that movement of the cam follower 56 to an intermediate position between the two positions in slot 62 that are shown in FIGS. 1 and 3, respectively, will result in changing of the minor axis of the defined ellipse with respect to the major axis thereof to a position between that position wherein the axes are identically the same, such as would occur when a circle is defined and the extreme position when an ellipse with the maximum difference of lengths of such axes occurs. It is believed clear that the "arm-actuating means" comprises the rod 24, the stationary collar 28, the pivotal sleeve member 42, the rotatable arm-actuating collar 64, the pivotal linkage 70, and their various parts which operatively connect them together.

From the foregoing description, it will be understood that the arm-actuating means functions to control the shape of the ellipse that is cut on the skirt of the piston 20. If desired, a skirt having a uniform ellipse can be formed by holding the draw-bar 16 stationary in a fixed position relative to the feeding mechanism for advancing the piston 20 into the tool head 10. Not only can the shape of the ellipse be controlled by the positioning of the draw-bar 16, but it also can be controlled by the shape of the slot 62 in the cam member 58. If desired, the cam member 58 can be removed from its pocket 60, and a cam member having a different shape can be inserted in place thereof.

As previously described, an eccentric pivot 76 is provided for pivotally supporting the tool arm 74 on the rotatable tool support 22. This structure will now be described with particular reference to FIGS. 1 and 5. As there shown, a pin 80 is mounted in the wall of the rotatable tool support 22 and it has an eccentric middle portion 82 whose axis is offset from the axis of the opposite ends of the pin 80. The tool arm 74 is arranged to pivot on the eccentric mid-portion 82. Secured to the mid-portion 82 so as to turn therewith is a linkage 84 which carries a locking screw 86 at its one end for clamping the linkage securely to the eccentric portion 82. Located on the upper end of the linkage 84 is a pivot pin 88 on which is pivotally mounted another linkage 90. The latter is pivotally connected to another collar 92 which is supported for rotation on the lower end of the rod or element 24. It will be observed that this connection, between linkage 90 and collar 92, is made by means of a pivot pin 94 which extends into a pair of arms 96, only one of which is shown in FIG. 1, which are integral parts of the rotatable collar 92. The latter is permitted to rotate relative to the lower end of the rod or element 24 by means of a suitable roller bearing 98. The eccentric 76 and the described linkage which couples it to the end of the rod or element 24 serves the purpose of permitting the cutting tool 78 to be advanced or retracted from the axis of the rotatable tool support 22 to enlarge or reduce the depth of cut made into the workpiece 20. It will be observed that when the rod or element 24 is advanced or retracted, the described linkage will change the effective center of the eccentric pivot 76, thereby moving the tool 78 inward or outward with respect to the workpiece 20, and this change will remain uniform throughout the entire circumference of the cut. By virtue of this arrangement, the skirt of the piston 20 can be flared in a manner such as is desired by actuating draw-bar 16 at desired times or rates of advance with respect to the feeding of workpiece 20 into the tool head 10 by means of cam 5. It is to be understood also that the extent of this flaring can also readily be varied merely by changing the pin 80 to one having greater or lesser eccentricity.

One of the particularly advantageous features of the construction described herein is the fact that the flaring can be done in such a manner as to introduce a slight "barrel-shape" to the skirt as can be seen in the several figures of the drawing. It will be observed that the piston skirt has a taper, and near the lower end of the piston 20 the skirt is rounded into the first oil ring groove. This curvature can readily be formed in the workpiece when using the illustrated embodiment of the invention by providing cam 5 with the necessary shape. It is to be noted that when the draw-bar 16 is in its fully retracted position (FIG. 3), the cutting tool 78 will be turned in a circle. As the draw-bar 16 is moved into the tool head 10, the circular motion of tool 78 will be changed to an elliptical motion with the minor axis of the elliptical path being progressively reduced as the magnitude of angle B is progressively increased in the rotated position of the tool head 22 shown in FIG. 1. Thus the draw-bar 16 is effective, through linkage 70, to provide for a machining of the skirt of piston 20 to cross section which varies from circular to elliptical, with this variation and the variation in the minor axes of the elliptical cross sections being controllable by cam surface 62. A "back-taper" and "barrel" is formed on the piston skirt by the draw-bar 16 acting through link 90 and eccentric pivot 76, with the shape of the back taper and the barrel being controlled by cam 5 as tool head 22 and piston are moved relative to each other (FIG. 1). In a plane through the piston skirt on which the major axes of the elliptical cross sections are located, the extent of back taper and the shape of the barrel are controlled solely by the eccentric pivot 76, thereby providing more precise control of the shape of this part of the piston, which it has been found is important in providing desired piston shapes for most efficient engine operation.

It is contemplated that the draw-bar 16 will always be in its retracted position (FIG. 3) when no workpiece 20 is in position for cutting. When this occurs, there will be no reciprocal action of the tool arm 74 or any of its associated parts, and therefore, there will be essentially no wear on these various parts during this stage of the machining operations. Thus, the machine 1 can continue to rotate at operating speed during these intervals of time without causing unnecessary wear of the tool head. It will be understood that it is desirable to have the tool head of the machine continue turning at a uniform speed, because this eliminates the harmful effects of repeatedly stopping and starting a piece of equipment where a substantial amount of inertia is involved for the starting and stopping operations. Therefore, minimum wear occurs when using the present machine 1 because the machine 1 can continue to turn during those periods of time when workpieces 20 are being advanced and retracted from the work-cutting position, and also during those periods of time when workpieces are being inserted into the work feeding apparatus.

It is to be understood that while the machine 1 has been described with the piston 20 moving upwardly into the tool head 22, the parts of the machine 1 can be oriented in other planes and the tool head 22 can be moved over a stationary piston 20, since the important consideration is relative axial movement of tool head and piston when they are coaxially arranged. Also, a second tool carrying arm, like arm 74, can be mounted on head 22 diametrically opposite arm 74 to either balance the complete head 22 or to provide a pair of tools 78 one of which accomplishes a rough cutting of the piston and the other a finish machining. It is also to be understood that the machine 1 is capable of machining parts other than pistons, such as cams, by virtue of the ability of the machine 1 to move a tool 78 through controllable and complex paths.

Having thus described my invention, I claim:

1. A machine for moving a tool in an elliptical path comprising a tool support mounted to rotate around an axis, an arm mounted on said support for reciprocal movement of one end thereof toward and away from said axis, said one end being adapted to carry a tool, and arm-actuating means coupled to said arm and responsive to turning of said support for moving said one end in a plane normal to said axis and in an elliptical path around and relative to said axis.

2. A machine according to claim 1 in which said arm is pivotally mounted on said support at a position spaced from said one end and said arm actuating means includes a linkage pivotally attached to said arm and means responsive to rotateion of said tool support for oscillating said linkage so as to move said one end of said arm in said elliptical path.

3. A machine according to claim 2 in which said linkage has a pair of ends one of which is mounted so that it moves in a circular path inclined with respect to the axis about which said tool support rotates, and means pivotally attaching the opposite end of said linkage to said arm at a position spaced from the pivotal mounting of said arm so that on each quarter revolution of said tool support said opposite end of said linkage is moved toward said axis an amount proportional to the magnitude of the inclination of said circular path to thereby provide for movement of said one end of said arm in an elliptical path on each revolution of said tool support.

4. A machine according to claim 3 further including draw-bar means movable axially of said tool support and means connecting said draw-bar means and said opposite end of said linkage so that in response to axial movement of said draw-bar means said magnitude of inclination of said circular path is changed.

5. A machine according to claim 4 further including means connected to and extending between said draw-bar means and said pivotal mounting of said arm on said tool support providing for movement of said pivotal mounting in a direction having a component perpendicular to said axis in response to axial movement of said draw-bar means.

6. A machine according to claim 4 further including means for supporting a workpiece adjacent said tool support and in a coaxial relation therewith, means providing for relative axial movement of said workpiece and said tool support toward each other, and means for axially moving said draw-bar means in response to said relative movement.

7. A apparatus for machining piston skirts to an elliptical cross section of variable shape comprising:
  (a) a tool support having an axis of rotation;
  (b) an arm having a pair of ends and pivotally mounted on said tool support intermediate said ends at a position spaced from said axis;
  (c) a cutting tool mounted on one end of said arm so that on pivotal movement of said arm said tool is moved toward and away from said axis;
  (d) a linkage member having a pair of ends one of which is pivotally attached to the opposite end of said arm;
  (e) rotatable means positioned adjacent said opposite end of said arm for rotation in a circular path inclined with respect to said axis;
  (f) and pivot means attaching said rotatable means to the opposite end of said linkage member so that said pivot means is rotated in said circular path to thereby provide for oscillation of said linkage member relative to said path on rotation of said tool support, to thereby provide for movement of said cutting tool toward and away from said axis during each revolution of said tool support.

8. Apparatus according to claim 7 further including draw-bar means movable along said axis and disposed in a supporting relation with said rotatable means, and cam means operable in response to movement of said draw-bar means along said axis to vary the inclination of said circular path.

9. Apparatus according to claim 7 further including means for moving said tool for machining said piston skirt with a back taper and barrel shape, said last mentioned means comprising:
  (a) said pivotal mounting for said arm being an eccentric capable of rotation to provide for movement of the pivotal support for said arm toward and away from said axis; and
  (b) means connected to and extending between said draw-bar means and said eccentric for rotating said eccentric in response to movement of said draw-bar along said axis.

10. Apparatus according to claim 9 further including a fixture for supporting a piston for movement along said axis, movable means operable to provide for relative movement of said fixture and said tool support toward each other along said axis so that said tool will rotate around and lengthwise of a piston on said fixture in engagement therewith, and means including a cam and an associated follower providing for movement of said draw-bar means along said axis in response to movement of said movable means to provide said relative tool support and fixture movement so that the movement of said draw-bar means is determined by the shape of said cam.

References Cited

UNITED STATES PATENTS 2,720,806    10/1955    Stewart _ _ _ _ _ _ _ _ _ _ _    82—18 XR LEONIDAS VLACHOS, *Primary Examiner.*